US010600422B2

(12) United States Patent
Sekine

(10) Patent No.: US 10,600,422 B2
(45) Date of Patent: Mar. 24, 2020

(54) VOICE RECOGNITION DEVICE CONFIGURED TO START VOICE RECOGNITION IN RESPONSE TO USER INSTRUCTION

(71) Applicant: TOSHIBA TEC KABUSHIKI KAISHA, Tokyo (JP)

(72) Inventor: Naoki Sekine, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 15/693,427

(22) Filed: Aug. 31, 2017

(65) Prior Publication Data

US 2018/0075850 A1 Mar. 15, 2018

(30) Foreign Application Priority Data

Sep. 15, 2016 (JP) ................................ 2016-180447

(51) Int. Cl.
*G10L 17/22* (2013.01)
*G10L 15/22* (2006.01)
*G10L 15/183* (2013.01)
*G10L 15/04* (2013.01)
*G10L 15/26* (2006.01)
*G10L 15/02* (2006.01)
(Continued)

(52) U.S. Cl.
CPC .............. *G10L 17/22* (2013.01); *G10L 15/02* (2013.01); *G10L 15/14* (2013.01); *G10L 15/22* (2013.01);
(Continued)

(58) Field of Classification Search
CPC ......... G10L 17/06; G10L 17/22; G10L 15/02; G10L 15/04; G10L 15/14; G10L 15/183;
(Continued)

(56) References Cited

U.S. PATENT DOCUMENTS 8,290,772 B1 * 10/2012 Cohen ................... G06F 17/276
369/25.01
9,460,708 B2 * 10/2016 Zweig ................... G10L 15/063
(Continued)

FOREIGN PATENT DOCUMENTS

JP 2003177789 A 6/2003
JP 2005309065 A 11/2005
(Continued)

OTHER PUBLICATIONS

Youssef Bassil et al., Post-Editing Error Correction Algorithm for Speech Recognition using Bing Spelling Suggestion, (IJACSA) International Journal of Advanced Computer Science and Applications, vol. 3, No. 2, 2012, pp. 95-101.
(Continued)

*Primary Examiner* — Walter Yehl
(74) *Attorney, Agent, or Firm* — Kim & Stewart LLP

(57) ABSTRACT

A voice recognition device includes a memory and a processor. The processor is configured to store in the memory, digital voice data corresponding to a voice signal input from a voice input unit, recognize a spoken voice utterance from the voice data after a voice input start instruction is received, determine whether to correct the recognition result of the spoken voice utterance based on a time interval from a time when the voice input start instruction is received to a time when the voice signal is input via the voice input unit, and correct the recognition result of the voice utterance based on the time interval.

17 Claims, 5 Drawing Sheets

(51) Int. Cl.
  *G10L 15/14* (2006.01)
  *G10L 17/06* (2013.01)
  *G10L 15/197* (2013.01)
(52) U.S. Cl.
  CPC .............. *G10L 15/26* (2013.01); *G10L 17/06* (2013.01); *G10L 15/04* (2013.01); *G10L 15/183* (2013.01); *G10L 15/197* (2013.01)
(58) Field of Classification Search
  CPC ....... G10L 15/197; G10L 15/22; G10L 15/26; G10L 15/28
  See application file for complete search history.

(56) References Cited

U.S. PATENT DOCUMENTS

| | | | |
|---|---|---|---|
| 2006/0206326 A1* | 9/2006 | Fukada | ................. G10L 15/187 704/239 |
| 2008/0109223 A1 | 5/2008 | Hirota et al. | |
| 2010/0180198 A1* | 7/2010 | Iakobashvili | ......... G06F 17/273 715/257 |
| 2010/0185448 A1 | 7/2010 | Meisel | |
| 2011/0208525 A1* | 8/2011 | Inoue | ...................... G10L 15/22 704/249 |

FOREIGN PATENT DOCUMENTS

| | | |
|---|---|---|
| JP | 2006039342 A | 2/2006 |
| JP | 2009122598 A | 6/2009 |

OTHER PUBLICATIONS

Extended European Search Report dated Feb. 16, 2018, mailed in counterpart European Application No. 17191196.9, 9 pages.

* cited by examiner

FIG. 2

| WORD | PRONUNCIATION | ~131A |
|---|---|---|
| make | [māk] | |
| ache | [āk] | |
| up | [əp] | |
| cup | [kəp] | |
| lake | [lāk] | |
| cake | [kāk] | |
| bake | [bāk] | |
| rake | [rāk] | |
| nake | [nāk] | |
| wake | [wāk] | |
| take | [tāk] | |

| | make [māk] | ache [āk] | Up [əp] | cup [kəp] |
|---|---|---|---|---|
| make [māk] | 0.1 | 0.1 | 0.5 | 0.1 |
| ache [āk] | 0.1 | 0.1 | 0.1 | 0.2 |
| Up [əp] | 0.4 | 0.1 | 0.1 | 0.1 |
| cup [kəp] | 0.1 | 0.1 | 0.1 | 0.1 |

| | cup [kəp] | Up [əp] |
|---|---|---|
| lake [lāk] | 0.2 | 0.3 |
| cake [kāk] | 0.1 | 0.1 |
| bake [bāk] | 0.1 | 0.1 |
| rake [rāk] | 0.1 | 0.1 |
| nake [nāk] | 0.1 | 0.1 |
| wake [wāk] | 0.1 | 0.1 |
| take [tāk] | 0.1 | 0.2 |

VOICE RECOGNITION DEVICE CONFIGURED TO START VOICE RECOGNITION IN RESPONSE TO USER INSTRUCTION

CROSS-REFERENCE TO RELATED APPLICATION

This application is based upon and claims the benefit of priority from Japanese Patent Application No. 2016-180447, filed Sep. 15, 2016, the entire contents of which are incorporated herein by reference.

FIELD

Embodiments described herein relate generally to a voice recognition method, a voice recognition device that performs a voice recognition using the method, and a voice recognition program that causes a computer to function as the voice recognition device.

BACKGROUND

In recent years, an electronic apparatus is known, which is equipped with a voice recognition device and, when a user gives a desired voice instruction, recognizes the voice and performs an operation in accordance with the recognized instruction. Generally, this electronic apparatus includes a voice input start button and, after the user's operation of the voice input start button, the voice recognition device receives the voice input. However, in the voice recognition device, an erroneous recognition may occur if the user starts to speak before the device enters the voice recognizing state and thus the beginning part of the voice signal cannot be recorded by the device.

In order to prevent such a problem, a technology for notifying the user of a speech start timing by displaying a predetermined image on a display screen during a time interval from the time when the voice input start button is operated to the time when the voice recognition enters an operable state is known. However, there is a problem that this technology can be applied to only the electronic apparatus having the display screen, and in order to display the image, the processing load on the processor that controls the electronic apparatus increases.

DESCRIPTION OF THE DRAWINGS

FIG. 2 is a table illustrating an example of a word dictionary file included in the voice recognition device.

FIG. 3A and FIG. 3B are tables illustrating examples of language dictionary files included in the voice recognition device.

DETAILED DESCRIPTION

Embodiments provide a voice recognition technology that can decrease an erroneous recognition caused by a fact that a beginning part of the voice signal cannot be recorded, without notifying a user of a speech start timing.

In general, according to an embodiment, a voice recognition device includes a memory and a processor. The processor is configured to store in the memory, digital voice data corresponding to a voice signal input from a voice input unit, recognize a spoken voice utterance from the voice data after a voice input start instruction is received, determine whether to correct the recognition result of the spoken voice utterance based on a time interval from a time when the voice input start instruction is received to a time when the voice signal is input via the voice input unit, and correct the recognition result of the voice utterance based on the time interval.

Hereinafter, embodiments of a voice recognition device that can decrease an erroneous recognition caused by a fact that a beginning part of the voice signal cannot be recorded, without notifying a user of a speech start timing, will be described with reference to the drawings.

Figure 1:
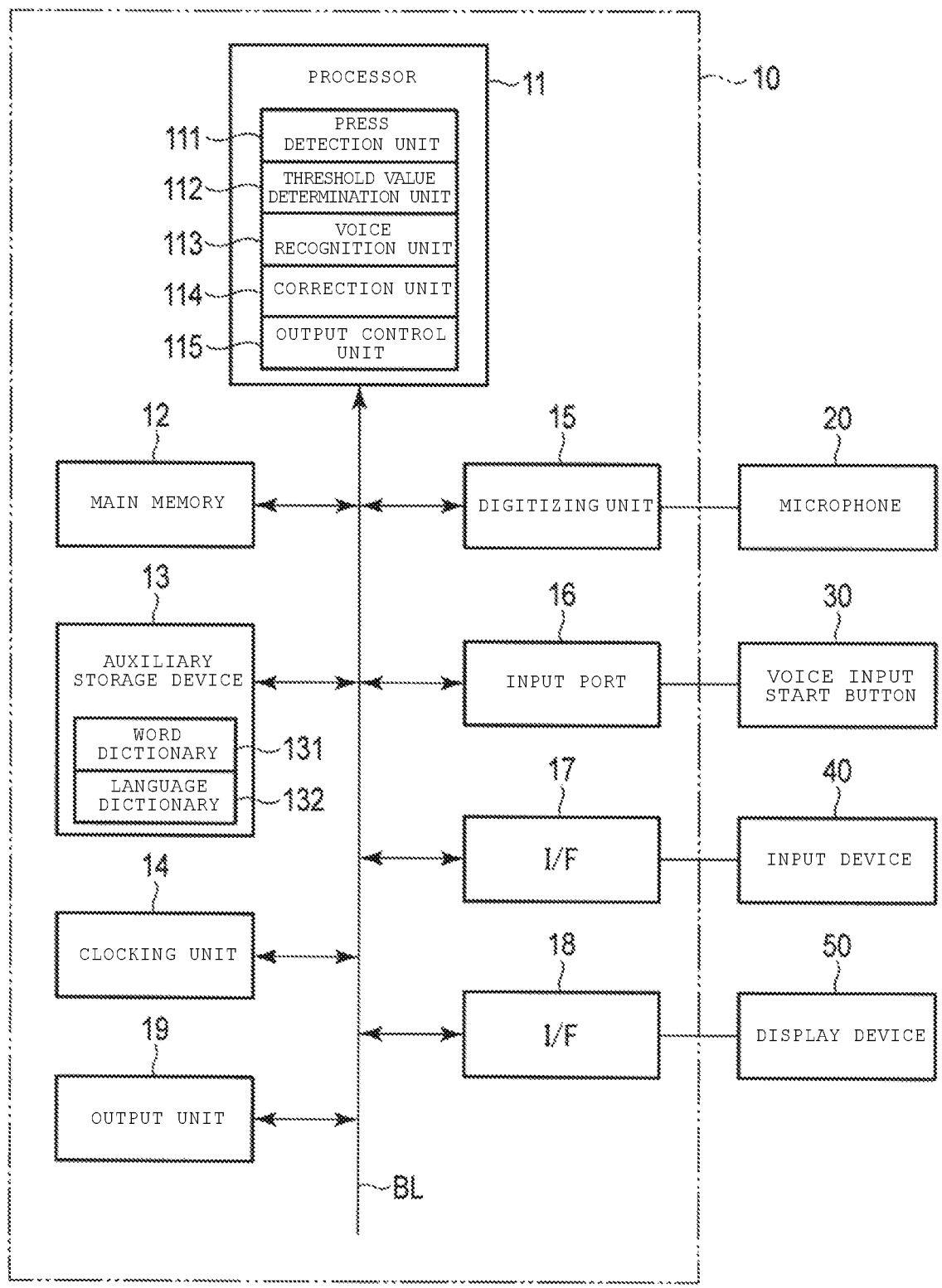
FIG. 1 is a configuration block diagram of a voice recognition device according to an embodiment.

FIG. 1 is a block diagram illustrating a main configuration of a voice recognition device 10 according to the present embodiment. When receiving a voice input start instruction, the voice recognition device 10 recognizes a voice utterance from a voice signal input after receiving the start instruction. The voice recognition device 10 determines whether or not correction of a result of recognition of the voice utterance is needed based on a time interval from the time when the start instruction is received to the time when the input of the voice signal is started, and corrects the recognized voice utterance in a case where it is determined there is a need to correct. The voice recognition device 10 described above is incorporated in, for example, an electronic apparatus such as a portable order terminal used in a restaurant or a maintenance record terminal used for maintenance work on industrial equipment, and achieves a function of assisting proper understanding of the voice input by the user.

As illustrated in FIG. 1, the voice recognition device 10 includes a processor 11, a main memory 12, an auxiliary storage device 13, a clocking unit 14, a digitizing unit 15, an input port 16, a plurality of device interfaces 17 and 18, and an output unit 19. In addition, the voice recognition device 10 includes a bus line BL including an address bus, a data bus, and the like, and the processor 11, the main memory 12, the auxiliary storage device 13, the clocking unit 14, the digitizing unit 15, the input port 16, the device interfaces 17 and 18, and the output unit 19 are connected to the bus line BL.

A microphone 20, which is a voice input unit, is connected to the digitizing unit 15, and the digitizing unit 15 converts an analog voice signal input via the microphone 20 to a digital voice signal. The microphone 20 may be incorporated in the electronic apparatus on which the voice recognition device 10 is mounted, or may be removably connected to the voice recognition device 10 from the exterior thereof. In a case where the microphone 20 itself can generate and output the digital voice signal which is digital data, the digitizing unit 15 may be omitted.

A voice input start button 30, which is a voice input start instruction unit, is connected to the input port 16, and the input port 16 inputs an ON signal of the voice input start button 30 when the voice input start button is activated. The user presses the voice input start button 30 while speaking toward the microphone 20. The voice input start button 30 outputs the ON signal while being pressed. The voice input start button 30 may switch between outputting the ON signal and stopping the ON signal alternatively at each pressing of the voice input start button 30.

A device interface 17 connects an input device 40 to the bus line BL and acquires input data from the input device 40 according to a predetermined protocol. A keyboard, a touch panel, and a pointing device are examples of an input device 40. A display device 50 is connected to a device interface 18, and the device interface 18 outputs display data therethrough to the display device 50 according to a predetermined protocol. A liquid crystal display, a plasma display, and an electroluminescent (EL) display are examples of the display device 50. The devices connected to the device interfaces 17 and 18 are not limited to the input device 40 and the display device 50. For example, a printer may be connected to the device interface instead of the display device 50 as an output device. In addition, a barcode reader, an RFID reader writer, a card reader writer, or the like may be connected to the device interface instead of the input device 40.

Incidentally, the microphone 20, the voice input start button 30, the input device 40 and the display device 50 are disposed in the electronic apparatus on which the voice recognition device 10 is mounted. In this case, the voice input start button 30 may be provided on a keyboard or a touch panel which is a kind of the input device 40.

The voice recognition device 10 configures a computer with the processor 11, the main memory 12, and the auxiliary storage device 13, and the bus line BL through which the above-described devices communicate with each other. The processor 11 corresponds to a central portion of the computer described above. The processor 11 controls each unit that realizes the functions of the voice recognition device 10, according to the operating system and the application programs. The processor 11 is, for example, a central processing unit (CPU). Moreover, all or some of the functions of the processor 11 can be realized by a control circuit, ASICs, a programmed processor, or a combination thereof.

The main memory 12 corresponds to a main memory portion of the computer. The main memory 12 includes a non-volatile memory area and a volatile memory area. The main memory 12 stores the operating system and the application programs in the non-volatile memory area. In addition, the main memory 12 stores the data necessary for performing the processing for the processor 11 to control each unit, in the non-volatile memory area or the volatile memory area.

The main memory 12 uses the volatile memory area as a recording unit for the voice signal input via the microphone. That is, the main memory 12 has an area for repeatedly overwriting and saving the voice signal which is acquired as a result of conversion of the analog voice signal to digital data by the digitizing unit 15 in a predetermined unit of buffering. This area as the recording unit may be formed in the auxiliary storage device 13.

The auxiliary storage device 13 corresponds to the auxiliary memory portion of the computer. For example, an electric erasable programmable read-only memory (EE-PROM), a hard disc drive (HDD), and solid state drive (SSD), or the like are used as the auxiliary storage device 13. The auxiliary storage device 13 saves the data used for the processor 11 to perform various operations and the data generated in the processing by the processor 11. In some cases, the auxiliary storage device 13 stores the application programs described above.

The auxiliary storage device 13 stores a word dictionary file 131 and a language dictionary file 132 necessary for the voice recognition. As illustrated in FIG. 2 as an example, the word dictionary file 131 is a data file in which various words and pronunciation of the words are recorded in advance. For example, words "make", "ache", "up", "cup", "lake", "cake", "bake", "rake", "nake", "wake", and "take" and the respective pronunciations thereof [māk], [āk], [ə p], [kap], [lāk], [kāk], [bāk], [rāk], [nāk], [wāk], and [tāk] are recorded in a word dictionary file 131A.

As illustrated in FIGS. 3A and 3B as an example, a language dictionary file 132 is a data file in which probabilities of a relationship between the various words are recorded in advance. For example, "0.1" as a probability that the word "make" will appear after the word "make", "0.1" as a probability that the word "ache" will appear, "0.5" as a probability that the word "up" will appear, and "0.1" as a probability that the word "cup" will appear are recorded in the language dictionary file 132A. Similarly, "0.1" as a probability that the word "make" will appear after the word "ache", "0.1" as a probability that the word "ache" will appear, "0.1" as a probability that that the word "up" will appear, and "0.2" as a probability that the word "cup" will appear are recorded in the language dictionary file 132A.

On the other hand, "0.2" as a probability that the word "lake" appears before the word "cup", "0.1" as a probability that the word "cake" appears, "0.1" as a probability that the word "bake" appears, "0.1" as a probability that the word "rake" appears, "0.1" as a probability that the word "nake" appears, "0.1" as a probability that the word "wake" appears, and "0.1" as a probability that the word "take" appears are recorded in the language dictionary file 132B. Similarly, "0.3" as a probability that the word "lake" appears before the word "up", "0.1" as a probability that the word "cake" appears, "0.1" as a probability that the word "bake" appears, "0.1" as a probability that the word "rake" appears, "0.1" as a probability that the word "nake" appears, "0.1" as a probability that the word "wake" appears, and "0.2" as a probability that the word "take" appears are recorded in the language dictionary file 132B.

Referring now back to FIG. 1, the clocking unit 14 functions as the time information source of the voice recognition device 10. The processor 11 acquires the current date and time based on the current time information of the clocking unit 14. A timepiece included in the electronic apparatus on which the voice recognition device 10 is mounted may also be used as the clocking unit 14.

The output unit 19 outputs the voice utterance data which is a result of recognition by the voice recognition device 10 to the exterior thereof. The data output destination is, for example, a control unit of the electronic apparatus on which the voice recognition device 10 is mounted.

In the voice recognition device 10 configured as described above, the processor 11 has functions of a press detection unit 111, a threshold value determination unit 112, a voice recognition unit 113, a correction unit 114, and an output control unit 115. These functions are realized by the processor 11 performing the information processing by executing the voice recognition program. The voice recognition program is stored in the main memory 12 or in the auxiliary storage device 13. The voice recognition program need not be stored in the main memory 12 or the auxiliary storage device 13 in advance. In that case, a voice recognition program separately transferred from the electronic apparatus may be written into a writable storage device included in the electronic apparatus on which the voice recognition device 10 is mounted, according to the operation by the user or the like. The transfer of the voice recognition program can be performed by using a removable recording medium storing the program or receiving the program through the communication via the network. Any type of the recording medium can be used as long as the program can be stored therein, such as a CD-ROM or a memory card, and can be readable by the device.

Figure 4:
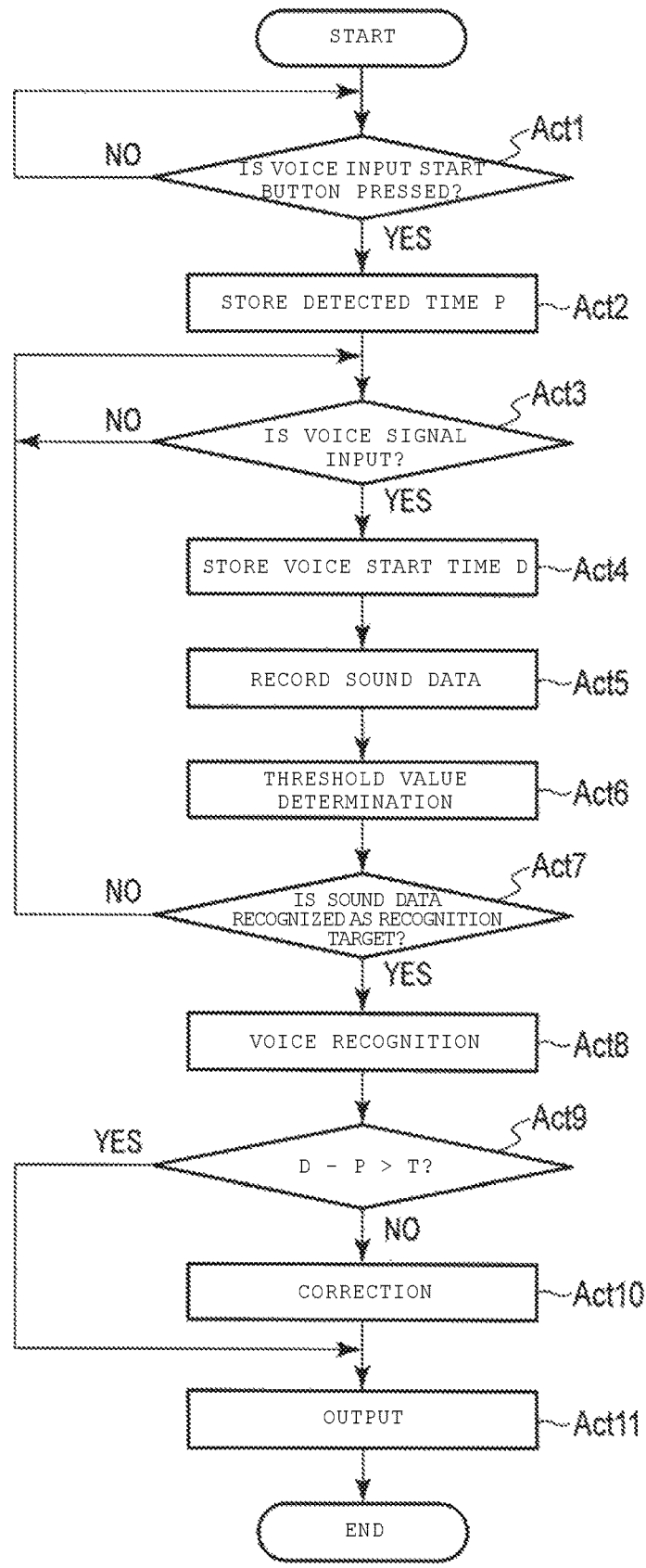
FIG. 4 is a flowchart depicting an information processing procedure performed by a processor in the voice recognition device according to a voice recognition program.

FIG. 4 is a flowchart depicting an information processing procedure performed by the processor 11 when executing the voice recognition program. The processing content described below using FIG. 4 is only an example, and the processing procedure and the processing content are not limited thereto as long as a similar voice recognition result can be obtained.

When the operation based on the voice recognition program is started, the processor 11 waits for pressing of the voice input start button 30 by the user as Act 1. When the ON signal is input via the input port 16, the processor 11 detects that the voice input start button 30 is pressed (YES in Act 1). The processor 11 causes the main memory 12 to store the time clocked by the clocking unit 14 in a predetermined area thereof as a detected time P as Act 2 (a first time acquisition unit). Here, the processor 11 functions as the press detection unit (reception unit) 111 by performing the operations of Act 1 and 2.

After the detected time P is stored, the processor 11 waits for receipt of the voice signal as spoken by the user as Act 3. When the voice signal which is digitized by the digitizing unit 15, so-called sound data, is input (YES in Act 3), the processor 11 causes the main memory 12 to store the time clocked by the clocking unit 14 in a predetermined area thereof as a voice start time D as Act 4 (a second time acquisition unit). In addition, the processor 11 records the sound data in the recording unit of the main memory 12 as Act 5.

The processor 11 performs a threshold value determination of the sound data as Act 6. The threshold value determination is a function of setting only the data of the voice uttered by the user as the sound subjected to the recognition process, and excluding the constantly occurring sound of the surroundings from a recognition target. Specifically, the processor 11 determines whether or not a volume of the sound data of a predetermined unit of buffering recorded in the recording unit is equal to or greater than a predetermined volume THP, and in a case where the volume of the sound data is equal to or higher than the predetermined volume THP, the sound data is set as the target data subjected to the voice recognition process.

The processor 11 recognizes the result of the threshold value determination as Act 7. In a case where the sound data is excluded from the recognition target as a result of the threshold value determination (NO in Act 7), the processor 11 returns to Act 3. The processor 11 repeats again the operations from. Act 3. On the contrary, in a case where the sound data is target data subjected to the recognition process (YES in Act 7), the processor 11 moves processing to Act 8. Here, the processor 11 functions as the threshold value determination unit 112 by performing the operations of Act 6 and Act 7.

In Act 8, the processor 11 performs the operation of the voice recognition. That is, the processor 11 calculates a voice feature data of the sound data in consideration of frequency characteristics of the sound data recorded in the volatile memory area of the main memory 12. The processor 11 creates a character string recognized as the spoken voice of the user from the sound data by performing probabilistic pattern recognition processing using the data in the word dictionary file 131 and the language dictionary file 132. The created character string of the voice utterance is temporarily stored in the main memory 12. Incidentally, the voice recognition method described here is a known method and the detailed description thereof will be omitted. In addition, the voice recognition method is not limited hereto, and the character string may be recognized as the spoken voice of a user from the sound data using another recognition method. By performing the operation of Act 8, the processor 11 here functions as the voice recognition unit (recognition unit) 113.

When the voice recognition of the sound data is finished, the processor 11 determines whether or not to correct the result of recognition of the user's spoken voice as Act 9 (determination unit). Specifically, the processor 11 determines whether or not an elapsed time (D-P) from the detected time P acquired by the operation of Act 2 to the voice start time D acquired by the operation of Act 4 is shorter than a threshold time T set in advance. In a case where the elapsed time is shorter than the threshold time T, the processor 11 determines that the correction is necessary. On the contrary, in a case where the elapsed time is not shorter than the threshold time T, the processor 11 determines that the correction is not necessary. In a case where it is determined that the correction is necessary (NO in Act 9), the processor 11 moves the processing to Act 11 after performing the operation of Act 10. In a case where it is determined that the correction is not necessary (YES in Act 9), the processor 11 moves the processing to Act 11 without performing the operation of Act 10.

In Act 10, the processor 11 corrects the user's spoken voice recognized by the operation of Act 8 (correction unit). A correction method for the received user's spoken voice will be described below. Here, the processor 11 functions as the correction unit 114 by performing the operations of Act 9 and Act 10.

In Act 11, the processor 11 outputs the recognized voice utterance by the operation of Act 8 or the user's spoken voice data corrected by the operation of Act 10 to the outside of the device via the output unit 19. Alternatively, the processor 11 may output the user's spoken voice data to the display device 50 and may cause the display device 50 to display the result of recognition on a screen of the display device 50. Here, the processor 11 functions as the output control unit 115 by performing the operation of Act 11.

Thus, the operations processed by the processor 11 based on the voice recognition program end.

Figure 5:
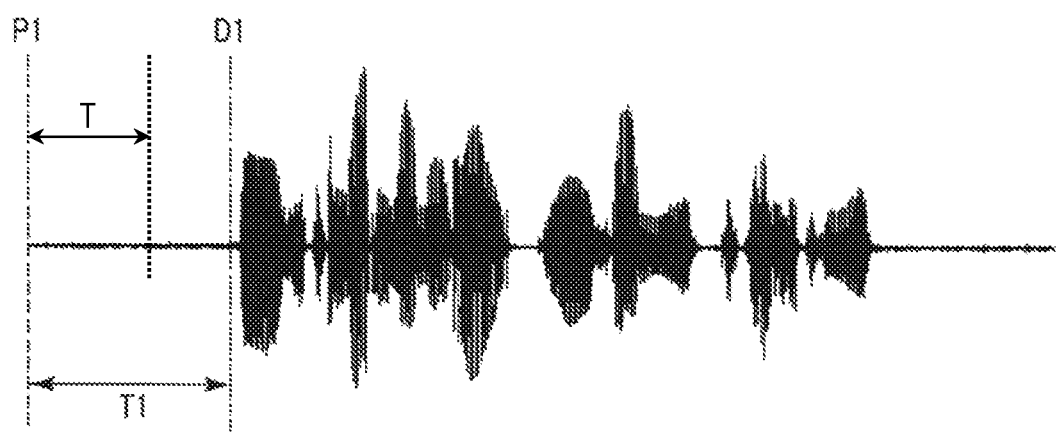
FIG. 5 is a diagram illustrating an example of a voice signal waveform.
Figure 6:
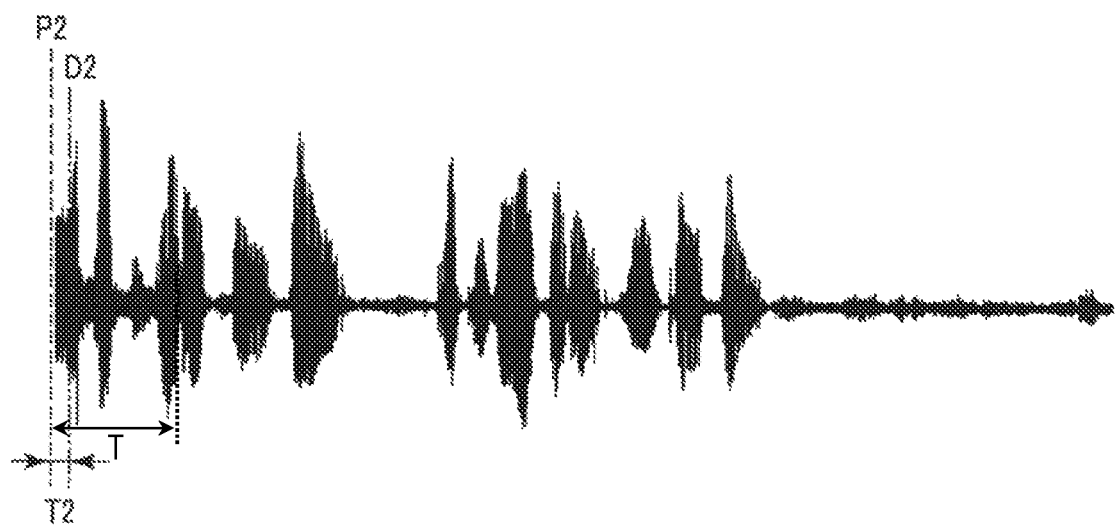
FIG. 6 is a diagram illustrating another example of the voice signal waveform.

FIG. 5 and FIG. 6 illustrate specific examples of the voice signals (analog data) received by the microphone 20 when the user pronounces a word "make up". In the example in FIG. 5, the pressing detected time P of the voice input start button 30 is indicated as "P1" and the voice start time D is indicated as "D1". That is, in the example in FIG. 5, the elapsed time from the pressing detected time P to the voice start time D is indicated as "T1". Similarly, in the example in FIG. 6, the pressing detected time P of the voice input start button 30 is indicated as "P2" and the voice start time D is indicated as "D2". That is, in the example in FIG. 6, the elapsed time from the pressing detected time P to the voice start time D is indicated as "T2".

Figure 7:
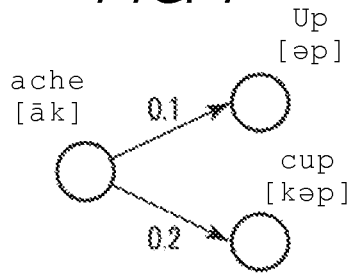
FIG. 7 is a state transition diagram in voice recognition.

In a case of example in FIG. 5, since the elapsed time T1 is longer than the threshold time T, missing of the beginning part of the sound data recorded in the recording unit does not occur. As a result thereof, the sound data is "[māk][ə p]" and the recognized voice utterance correctly becomes "make up". On the contrary, in a case of the example in FIG. 6, since the elapsed time T2 is shorter than the threshold time T, the beginning part "m" of the sound data recorded in the recording unit is missed. As a result thereof, the sound data is "[āk][ə p]", and the recognized voice utterance becomes "ache up") from a state transition diagram in FIG. 7. That is, a word "ache" is recognized from the beginning part of the sound data "[ā]" and the next sound data "[k]", and the probability that the sound data subsequent to the word "ache" is "up" is 0.1 while the probability that the sound data subsequent to the word "ache" is "cup" is 0.2. Therefore, the voice utterance is recognized as "ache cup").

Here, in the voice recognition device 10 according to the present embodiment, in a case where the elapsed time from the pressing detected time P to the voice start time D is shorter than the threshold time T set in advance, the processor 11 performs the operation for correcting the recognition result of the voice utterance. Now, it is assumed that the threshold time T has a relationship of T1>T>T2. In this case, the processor 11 does not perform the correction in the example in FIG. 5 but performs the correction in the example in FIG. 6.

Figure 8:
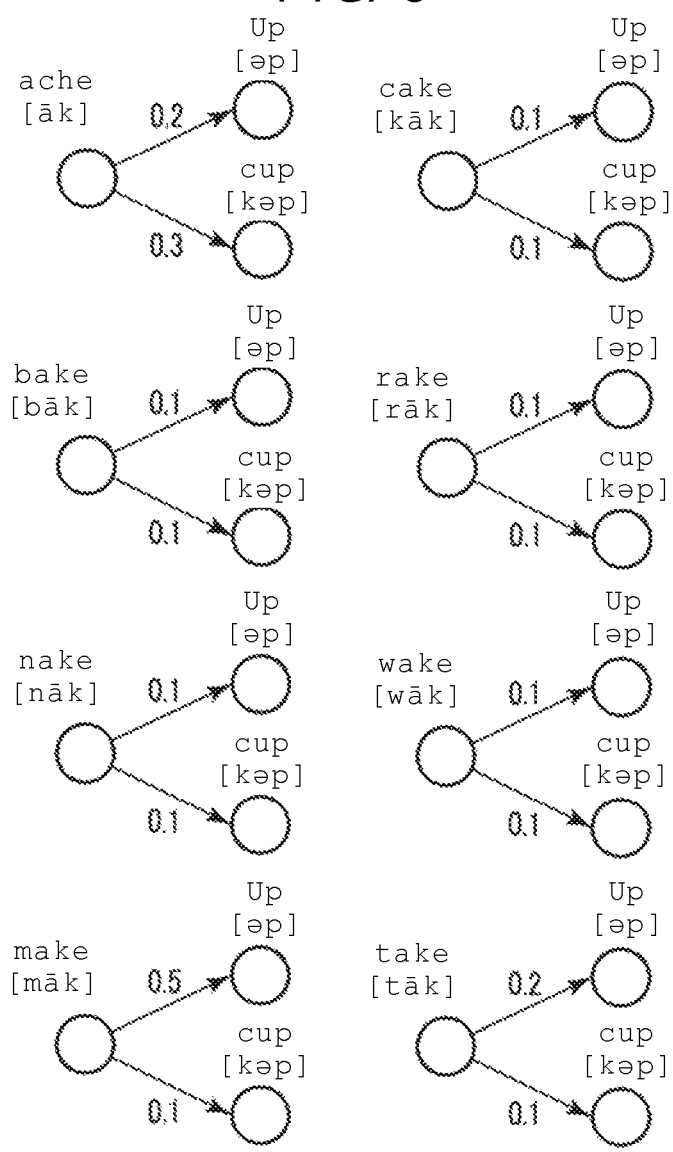
FIG. 8 is a state transition diagram in voice utterance correction.

Specifically, in a case where the beginning part of the sound data "[āk][ə p]" is a vowel "ā", the processor 11 sequentially adds the consonants "[m], [1], [k], [b], [r], [n], [w], and [t]" before the vowel. That is, the processor 11 creates the sound data items "[māk][ə p]", "[lāk][ə p]", "[k āk][ə p]", "[bāk] [ə p]", "[rāk] [ə p]", "[nāk] [ə p]", "[w āk][ə p]", and "[tāk][ə p]". Then, the processor 11 performs the pattern recognition processing again on each of these sound data items using the word dictionary file 131 and the language dictionary file 132. As a result thereof, when it is assumed that the state transition diagram illustrated in FIG. 8 is created, the processor 11 selects the sound data "[māk][ə p]" of which the probability of a relationship therebetween is the highest based on the state transition diagram. Then, the processor 11 corrects the recognition result of the voice utterance "ache up" to "make up".

As described above, according to the voice recognition device 10 in the present embodiment, even in a case where the time interval from the time when the user presses the voice input start button 30 to the time when the user starts the utterance is shorter than the threshold time T, and thus, an erroneous recognition occurs because the beginning part of the voice signal recorded in the recording unit is missed, it is possible to correct the recognition result of the voice utterance with a high probability. Therefore, the erroneous recognition caused by the fact that the beginning part of the voice signal was not recorded can be decreased without notifying the user of the speech start timing. Therefore, it is possible to provide a voice recognition device having high recognition accuracy.

In addition, according to the voice recognition device 10, it is not necessary to notify the user of the timing to start speaking by displaying a notification on the display screen. Therefore, it is possible to mount the device on an electronic apparatus having no display screen, and thus, the processing load on the processor 11 does not increase because of an operation to display the notification on the display screen. In addition, the processor 11 in the voice recognition device 10 performs the correction in a case where the time interval from the time the user presses the voice input start button 30 to the time the user starts speaking is shorter than the predetermined threshold time T, and does not perform the correction in a case where the time interval is equal to or longer than the threshold time T. Therefore, it is sufficient that the correction processing is performed only when the user speaks immediately after pressing of the voice input start button 30, and from this point as well, the processing load to the processor 11 does not significantly increase because of the correction processing.

In addition, the processor 11 includes the first time acquisition unit that acquires a first time at which the start instruction is received and the second time acquisition unit that acquires a second time at which the voice signal input is started. Therefore, the processor 11 can accurately acquire the time interval from the time the user presses the voice input start button 30 to the time the user starts speaking, and by setting an appropriate threshold time T prevent unnecessary correction from being performed.

In addition, in a case of correcting the recognition of the voice utterance, the processor 11 corrects the first word of the voice utterance by replacing the first word with another word which is related to the second and subsequent words of the voice utterance. Therefore, the correction processing is comparatively easy and can be performed within a short time, and thus, the processing load to the processor 11 does not significantly increase and a recognition speed is not significantly decreased compared to conventional voice recognition processes.

Hereinafter, another embodiment will be described.

In the embodiment, the processor 11 causes the detected time P to be stored in Act 2 and causes the voice start time D to be stored in Act 4 in FIG. 4. In another embodiment, if the pressing of the voice input start button 30 is detected in Act 1, the processor 11 starts a timer, and when the sound data is detected being received in Act 3, the processor 11 stops the timer. Then, in Act 9, the processor 11 compares the time clocked by the timer and the threshold time T, and determines whether or not to perform the correction processing. In even this configuration, it is possible to achieve an operation effect similar to that in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice recognition device comprising:
   a memory; and
   a processor configured to
      store in the memory, digital voice data corresponding to a voice signal input through a voice input unit;
      recognize a spoken voice utterance from the voice data after a voice input start instruction is received;
      based on a time interval from a time when the voice input start instruction is received to a time when the voice signal is input via the voice input unit, determine whether to correct a first word of the recognized voice utterance immediately after the time interval; and
      upon determining to correct the first word, replace the first word with another word that is related to a second word of the voice utterance that is subsequent to the first word.

2. The voice recognition device according to claim 1, wherein the processor determines to correct the first word when the time interval is shorter than a predetermined threshold time.

3. The voice recognition device according to claim 2, wherein the processor is further configured to:
   acquire a first time at which the start instruction is received;

acquire a second time at which the voice signal input is started via the voice input unit; and compute the time interval based on the first time and the second time.

4. The voice recognition device according to claim 1, wherein the another word that is related to the second word is formed by replacing a first letter of the first word with other letters.

5. The voice recognition device according to claim 1, further comprising:

a timer configured to measure the time interval between a time when the voice input start instruction is received and a time when the voice input unit first receives the spoken voice utterance.

6. The voice recognition device according to claim 1, further comprising:

a storage device in which a likelihood that the first word precedes the second word is stored in a look up table.

7. The voice recognition device according to claim 1, further comprising:

a storage device in which a likelihood that the first word follows the second word is stored in a look up table.

8. A voice recognition method, comprising:

receiving a voice input start instruction;

recognizing a spoken voice utterance from a voice signal received by a voice input unit after the start instruction is received and creating a recognition result of the spoken voice utterance;

based on a time interval from a time when the start instruction is received to a time when the voice signal is input via the voice input unit, determining whether to correct a first word of the recognized voice utterance immediately after the time interval; and upon determining to correct the first word, replacing the first word with another word that is related to a second word of the voice utterance that is subsequent to the first word.

9. The voice recognition method according to claim 8, wherein a determination is made to correct the first word when the time interval is shorter than a predetermined threshold time.

10. The voice recognition method according to claim 9, further comprising:

acquiring a first time at which the start instruction is received; and acquiring a second time at which an input of the voice signal is started via the voice input unit, and computing the time interval based on the first time and the second time.

11. The voice recognition method according to claim 8, wherein said another word that is related to the second word is formed by replacing a first letter of the first word with other letters.

12. The voice recognition method according to claim 8, further comprising:

measuring the time interval between a time when the start instruction is received and a time when the voice input unit first receives the spoken voice utterance.

13. The voice recognition method according to claim 8, wherein the first word is corrected based on a look up table that stores a likelihood that the first word precedes the second word.

14. The voice recognition method according to claim 8, wherein the first word is corrected based on a look up table that stores a likelihood that the first word follows the second word.

15. A non-transitory computer-readable medium storing a voice recognition program to be executed in a computer to which a voice input unit is connected, to carry out the steps of:

receiving a voice input start instruction;

recognizing a spoken voice utterance from a voice signal received by a voice input unit after the start instruction is received and creating a recognition result of the spoken voice utterance;

based on a time interval from a time when the start instruction is received to a time when the voice signal is input via the voice input unit, determining whether to correct a first word of the recognized voice utterance immediately after the time interval; and upon determining to correct the first word, replacing the first word with another word that is related to a second word of the voice utterance that is subsequent to the first word.

16. The non-transitory computer-readable medium according to claim 15, wherein a determination is made to correct the first word when the time interval is shorter than a predetermined threshold time.

17. The non-transitory computer-readable medium according to claim 16, wherein the steps further include:

acquiring a first time at which the start instruction is received; and acquiring a second time at which an input of the voice signal is started via the voice input unit, and computing the time interval based on the first time and the second time.

* * * * *